J. DAIN.
CASTER WHEEL.
APPLICATION FILED NOV. 23, 1914.
1,197,712.
Patented Sept. 12, 1916.
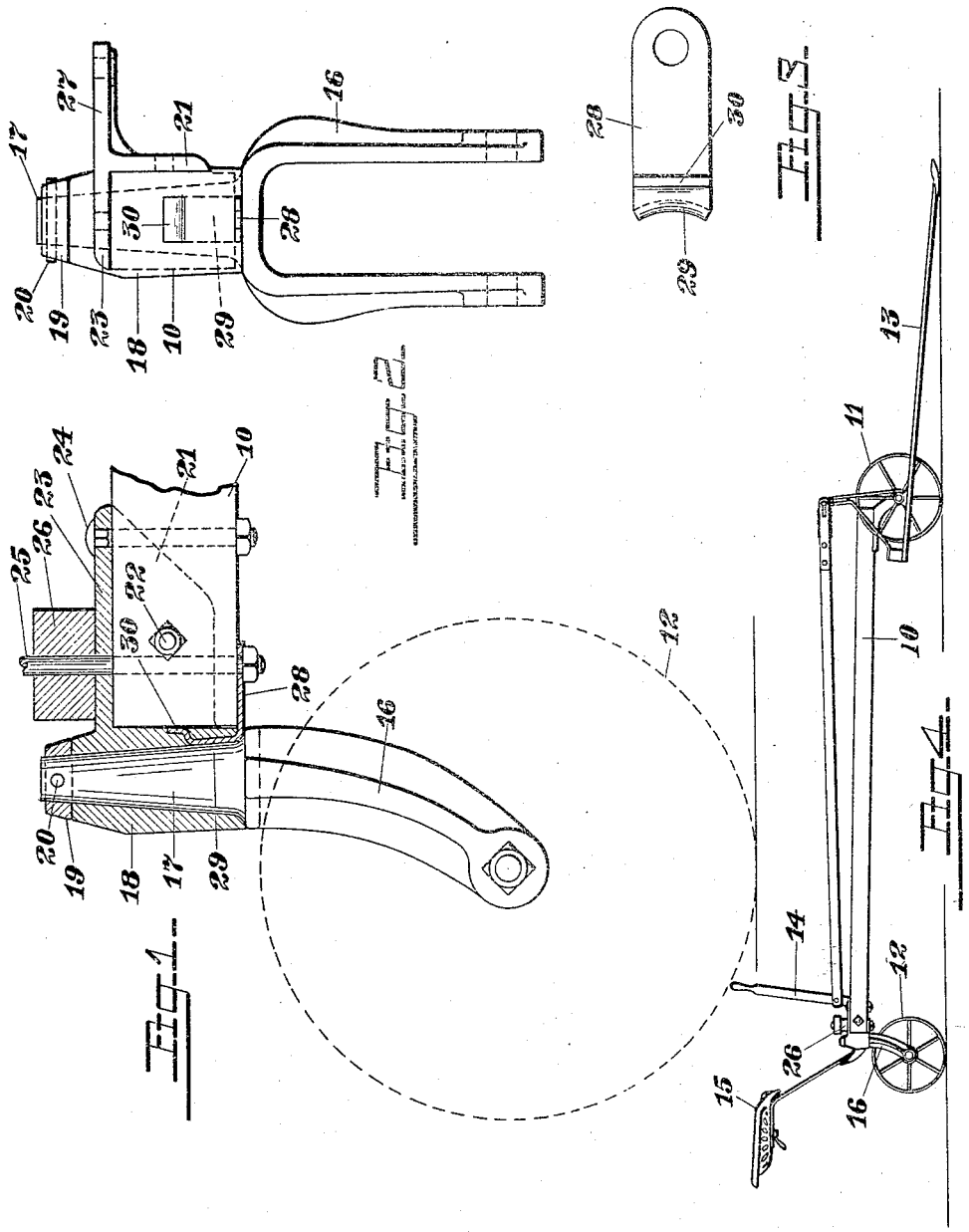

UNITED STATES PATENT OFFICE.

JOSEPH DAIN, OF MOLINE, ILLINOIS, ASSIGNOR TO DAIN MANUFACTURING COMPANY OF IOWA, OF OTTUMWA, IOWA, A CORPORATION OF IOWA.

CASTER-WHEEL.

1,197,712.  Specification of Letters Patent.  Patented Sept. 12, 1916.

Application filed November 23, 1914. Serial No. 873,540.

*To all whom it may concern:*

Be it known that I, JOSEPH DAIN, a citizen of the United States, residing at Moline, in the county of Rock Island, State of Illinois, have invented certain new and useful Improvements in Caster-Wheels, of which the following is a specification, reference being had to the accompanying drawings.

My invention relates to caster wheels and it has for one of its objects the provision of an improved form of caster wheel construction especially designed for use with hay rakes of the type which are propelled and guided by horses hitched behind the raking devices. In a rake of this type the rear portion of the backwardly-extending frame is supported on caster wheels so as to be readily swung to either side to steer the rake. These caster wheels are subjected to very great strain in traveling over rough uneven meadow lands, and it is one of the principal objects of my invention to provide a caster wheel, the supporting bracket of which may be so formed and reinforced as to be strong enough to resist the excessive stresses thereon. The preferred means by which I have accomplished these objects are illustrated in the accompanying drawings and are hereinafter specifically described. That which I believe to be new is set forth in the claims.

In the drawings: Figure 1 is a longitudinal vertical section through the bracket of my improved caster wheel construction showing the same mounted upon a rake frame (broken away); Fig. 2 is a front view of the bracket with the caster fork revolubly mounted therein; Fig. 3 is a top view of one of the bracket members; and Fig. 4 is a side view of a hay rake equipped with my improved caster wheel construction.

Referring to the several figures of the drawings in which corresponding parts are indicated by the same reference characters, 10 indicates the side bars of a framework of a hay rake provided with carrying wheels 11 at its front end and with caster wheels 12 at its rear end. Extending forward from the front end of the frame is a rake device 13 of any suitable type adapted to be controlled by a hand lever 14 near the rear end of the frame within convenient reach of an operator seated upon the seat 15.

As best shown in Figs. 1 and 2, the caster wheel 12 is revolubly mounted in a fork 16, the tapered stem or spindle 17 of which fork is revolubly mounted in a sleeve 18 forming a part of the supporting bracket, as hereinafter described. Mounted upon the upper end of the spindle 17 is a tapered washer 19 held in position by a pin 20 passing through the spindle, said washer serving to prevent the withdrawal of the spindle from the sleeve 18. Formed integrally with the sleeve 18 and extending forward therefrom is a vertical flange or plate 21 secured to the side bar 10 of the framework of the rake by means of a bolt 22. A horizontally-extending flange or plate 23 formed integrally with the vertical flange 21 and with the sleeve 18 is secured to the side bar 10 by means of a short bolt 24 and a longer bolt 25 which passes through both the side bar 10 and a transversely-extending bar 26. The horizontal flange 23 is provided with an extension 27 adapted to be secured in any suitable manner to the transversely-extending bar 26. The flanges 21 and 23 together with the extension 27 and the sleeve 18 constitute a bracket both for supporting the caster wheel 12 and for connecting the parts of the framework, as will be readily understood.

I have found in practice, in the use of a construction of the type above described, that, as the bars 10 and 26 shrink slightly through long continued use, or as the securing bolts become slightly loosened there is a tendency for the sleeve 18 to become shifted slightly from its exact vertical position relative to the framework of the rake causing an excessive twisting strain upon the flanges 21 and 23, with a consequent danger that such flanges become broken. To avoid this tendency of the old construction I have provided a reinforcing member 28 adapted to hold the lower end of the sleeve very firmly relative to the bar 10 and adapted to have a close fit upon said bar,—the upper face of which is in contact with the flange 23,—in spite of any slight variations in the size of such bar. As will be readily understood, with the rear end of the bracket member 28 suitably connected to the sleeve 18 at its lower end and with the forward end of such bracket member held in position by one or more of the bracket bolts, the supporting bracket will be very firmly held in position so as to guard against the tendency of the sleeve 18 to become inclined from a vertical position relative to the framework.

As best shown in Fig. 1, in the construction shown the bracket member 28 extends rearwardly from the bolt 25, is turned upward providing an arm 29 extending along the spindle 17, to the shape of which said arm conforms, as best shown in Fig. 3, and is provided at the upper end of the arm 29 with an offset end portion 30. As is shown clearly in Fig. 1, the front wall of the sleeve 18 is cored out to receive the arm 29 with its offset end 30. As will be readily understood, with the wall of the sleeve 18 cored out as described, with the spindle 17 removed from the sleeve a reinforcing member 28 can readily be inserted in position as shown. The arm 29 then serves to complete a symmetrical bearing for the spindle 17. Upon the insertion of the spindle, the member 28 is held firmly in position. The member 28 is designed to be formed of strap steel so that the forward end of the bracket can readily be forced or sprung upward into snug contact with the bar 10 by tightening the nut on the bolt 25 whether or not the bar 10 is of precisely the normal desired dimensions.

By the use of my improved construction the supporting bracket is held very firmly against becoming inclined out of its normal position relative to the framework, with a correspondingly smaller tendency of the bracket to become broken or loosened relative to the frame. In case it becomes necessary or desirable at any time to replace one of the removable reinforcing members 28 with a new member of this type, this can be done very readily and at a very small expense compared to the expense entailed by the breakage of an integral part of a bracket.

What I claim as my invention and desire to secure by Letters Patent is,—

1. In an agricultural implement, the combination of a frame bar, a bracket rigidly attached to said bar, and a caster wheel supported by said bracket, said bracket comprising a bearing for the spindle of said caster wheel, a plate formed integrally with said bearing for securing the bracket to said bar, and a reinforcing member detachably connected with said bearing near its lower end and rigidly connected with said bar adapted to hold the lower end of said bearing rigidly in position relative to said bar.

2. In an agricultural implement, the combination of a frame bar, the bracket attached to said bar, and a caster wheel supported by said bracket, said bracket comprising a sleeve forming a bearing for the spindle of said caster wheel, a non-yielding plate formed integrally with said sleeve near the upper end of the sleeve secured to the upper portion of said bar, and a reinforcing member detachably connected with said sleeve near its lower end and held against movement toward or from the axis of said sleeve but adapted to yield slightly longitudinally of the sleeve to be secured to the lower face of said bar for holding said sleeve firmly in position relative to said bar.

3. A caster wheel bracket for an agricultural implement comprising a sleeve, a flange formed integrally with said sleeve near its upper end, and a reinforcing member detachably connected with said sleeve near its lower end and held against movement longitudinally of itself but adapted to yield upward slightly to fit snugly against a bar inserted between said flange and said reinforcing member for securing said sleeve rigidly in position upon said bar.

4. In an agricultural implement, the combination of a bracket, and a caster wheel supported by said bracket, said bracket comprising a sleeve adapted to form a bearing for the spindle of said caster wheel, a flange formed integrally with said sleeve near its upper end, and a reinforcing member extending outwardly from the lower end of said sleeve, the inner end of said reinforcing member being removably secured in a suitable socket in said sleeve.

5. In an agricultural implement, the combination of a bracket, and a caster wheel supported by said bracket, said bracket comprising a sleeve adapted to form a bearing for the spindle of said caster wheel, a flange formed integrally with said sleeve near its upper end, and a reinforcing member extending outwardly from the lower end of said sleeve, the inner end of said reinforcing member being held firmly in position relative to said sleeve by the caster wheel spindle when said spindle is in position in said sleeve.

6. A caster wheel bracket for an agricultural implement comprising a sleeve, a flange formed integrally with said sleeve near its upper end, and a reinforcing member extending outwardly from the lower end of said sleeve, the inner end of said reinforcing member being mounted in a suitable socket formed in the wall of said sleeve, said reinforcing member being held firmly in said socket while its outer end is held in normal outwardly-extending position but being adapted to be readily removed from said socket when it is free to turn relative to the sleeve.

7. A caster wheel bracket for an agricultural implement comprising a sleeve, a flange formed integrally with said sleeve near its upper end and a reinforcing member extending outwardly from the lower end of said sleeve, the inner end of said reinforcing member having an interlocking engagement with a suitable socket formed in the wall of said sleeve but being adapted to be readily freed therefrom by swinging said member in said sleeve.

8. In a caster wheel bracket for an agricultural implement, the combination of a sleeve, a flange formed integrally with said sleeve near its upper end, and a reinforcing member extending outwardly from the lower end of said sleeve, said reinforcing member comprising an arm turned at an angle to the outer end of said member, said arm having an offset end, said arm being adapted to lie flush in a longitudinally-extending recess formed in the inner wall of said sleeve, and said offset end being adapted to extend into a correspondingly-formed opening in the wall of said sleeve.

JOSEPH DAIN.

Witnesses:
W. G. DUFFIELD,
JESSIE SIMSER.

Copies of this patent may be obtained for five cents each, by addressing the "Commissioner of Patents, Washington, D. C."